Patented June 12, 1951

2,556,888

UNITED STATES PATENT OFFICE 2,556,888

WATER REDUCIBLE 1,1 - BIS(p - CHLOROPHENYL)2,2,2 TRICHLOROETHANE PEST CONTROL COMPOSITIONS STABILIZED WITH METHYL CELLULOSE

Richard G. Smith, Harvey, Ill., assignor to The Sherwin-Williams Company, Cleveland, Ohio, a corporation of Ohio No Drawing. Application August 26, 1946, Serial No. 693,167

5 Claims. (Cl. 167—42)

This invention relates to water reducible pest control compositions, more particularly to insecticidal compositions containing a relatively high concentration of the active insecticidal ingredient, and to a method for the preparation thereof.

The expression "water reducible" is employed herein to describe compositions which are dispersible in water and which initially may be in the form of a dry powder, a wet cake, a suspension, or other suitable form. It is well known to prepare insecticidal, fungicidal, parasiticidal and other pest control compositions in which the active essential ingredient is dispersed with the assistance of a dispersing agent. Many of these compositions suffer from the disadvantage that the dispersing agent also assists in the removal of the composition from the foliage or other object to which it has been applied. Thus, a rain after the application of certain types of pest control compositions will wash away the active essential ingredient much more readily when certain types of dispersing agents are present.

One of the difficult problems encountered in the preparation of pest control compositions is the preparation of highly concentrated compositions, as, for example, those containing in excess of about 35% of the active pest control ingredient, which are characterized by the property that they are readily water reducible. It is obviously quite important, both to the manufacturer and consumer, to ship a pest control composition in a highly concentrated form and thereby avoid the extra costs incurred when large quantities of water are present in the composition. This problem is particularly manifest in the preparation of concentrated suspensions of 1,1-bis(p-chlorophenyl)2,2,2 trichloroethane, hereinafter referred to as DDT.

An important factor which must be considered in the preparation of more highly concentrated water reducible pest control compositions is that any auxiliary reagent should be of a character and should be used in quantities such that a film is not formed which will hide or substantially reduce the effect of the active essential ingredient or ingredients of the composition.

One of the objects of the present invention is to produce new and improved pest control compositions.

Another object of the invention is to produce new and improved highly concentrated pest control compositions.

Another object of the invention is to provide a pest control composition containing a substance which can be employed in a small amount to suspend the active pest control ingredient, and which does not form a film which hides or substantially reduces the effect of the active essential ingredient.

Still a further object of the invention is to produce new and improved highly concentrated DDT compositions.

A further object of the invention is to provide a new and improved process for producing the above identified pest control compositions.

Still another object of the invention is to provide a new and improved pebble mill processing method for the preparation of pest control compositions.

A more specific object of the invention is to provide a new and improved method of preparing water reducible, highly concentrated DDT suspensions. Other objects will appear hereinafter.

In accordance with the invention it has been found that new and improved results in the preparation of water reducible pest control compositions is obtained by employing methyl cellulose in conjunction with the active essential ingredient. It has also been found that the utilization of methyl cellulose in conjunction with DDT develops an unusual wetting of the DDT, which makes it possible to prepare highly concentrated DDT compositions by milling the DDT with methyl cellulose in the presence of water. Excellent results are obtained by the use of relatively small amounts of methyl cellulose, preferably less than 1% of a high viscosity methyl cellulose based on the weight of the composition.

The optimum quantity of methyl cellulose will vary to some extent, depending upon the viscosity type of methyl cellulose used and the practical viscosity for processing the mixture, together with the amount of water reducibility desired for the particular application. With a low viscosity methyl cellulose the optimum quantity is relatively higher than with a high viscosity methyl cellulose. The expression "high viscosity methyl cellulose" is employed herein to describe a methyl cellulose having a viscosity of at least approximately 4000 centipoise (cps.), while a "low viscosity methyl cellulose," as the term is used herein, may have a viscosity as low as 15 centipoise.

In the practice of the invention as applied to the preparation of DDT it has been found that relatively high concentrations of DDT in water are too heavy to grind as such on a pebble mill, but upon the addition of small amounts of methyl cellulose the DDT becomes wetted and can be successfully ground to an extremely fine state (e. g., an average particle size of 3-30 microns) in an economical length of time. For the purpose of the invention it is preferable to use a high viscosity methyl cellulose in conjunction with the active insecticidal ingredient for wetting and grinding. This produces less foam and a more satisfactory grind in processing compositions of this type on a pebble mill. Attempts to produce comparable compositions in the absence of the methyl cellulose or by the substitution of other water dispersible colloidal materials readily brought to mind by skilled compounders, for example, alginates, carboxymethyl cellulose, hydroxyethyl cellulose, and gum tragacanth, have been tried with the result that the compositions would be impractically stiff to process, apparently due to the fact that there has been no unusual wetting such as occurs when the methyl cellulose is a part of the composition.

The invention is further illustrated but is not limited by the following examples, in which the quantities are stated in parts by weight unless otherwise indicated.

*Example I*

In a 100 gallon jacketed, water cooled pebble mill 40 gallons of water and 2½ pounds of 4000 centipoise methyl cellulose were added. Dispersing agents and preservatives may also be used in the composition. The above ingredients were pebble milled until the methyl cellulose was dissolved in the water. Three hundred fifty (350) pounds of DDT (commercial) were then added and the mill rotated for 36 hours. Additional methyl cellulose—2½ pounds was added and the mill run until its solution was attained. The batch was then forced from the mill with compressed air and washed with 21 gallons of water into a receiving and filling tank. The product was approximately 40% DDT dispersion having commercial applications.

*Example II*

The process was carried out as in Example I except after initial grinding of the DDT 25 pounds of a 15 centipoise viscosity methyl cellulose was added and milled until the solution was complete. The batch was then forced from the mill into a receiving tank and washed with 18 gallons of water.

*Example III*

In a 100 gallon capacity, water cooled pebble mill 550 pounds of DDT press cake of 64% solids was added along with 2½ pounds of 4000 centipoise methyl cellulose. Sixteen (16) gallons of additional water were added, and after pebble milling for 56 hours an additional pound of 4000 centipoise methyl cellulose was added and milled into solution. The resulting product was forced from the mill and used as a concentrate.

*Example IV*

A dispersion of 50% DDT, 0.35% of 4000 centipoise methyl cellulose and 49.65% of water was ground in a jacketed water cooled pebble mill from 8 to 60 hours to produce a highly concentrated suspension of microcrystalline DDT in water which was stable on storage and readily reducible with water.

This example illustrates the preparation of a composition in which the percentage of DDT is near the maximum for pebble mill processing, and the quantity of methyl cellulose is near the minimum for optimum results.

*Example V*

A composition may be prepared by mixing 25% of 15 centipoise methyl cellulose, 5% of DDT and 70% of water. Such a composition is too viscous to prepare on a pebble mill, but may be compounded upon other milling equipment. The quantity of methyl cellulose in this case represents approximately the maximum amount of low viscosity methyl cellulose which might be employed in the practice of the invention and a minimum amount of the active essential ingredient.

In a manner similar to that described in the examples, the invention can be applied to the production of pest control compositions containing one or more of any of the following ingredients: 1,1-bis(p-chlorophenyl)2,2,2 trichloroethane, chlorinated naphthalenes, benzene hexachloride, dichlorodiphenyl ethane, diparachlorophenyl methyl carbinol, trichloro diphenyl ethane, difluoro diphenyl trichloroethane, and pyrethyrins.

The invention provides pest control compositions which will remain stable against decomposition when stored, are water reducible, contain no solvent for the active ingredient and can be prepared in a wide range of concentrations, including high concentrations as well as low concentrations.

With respect to compositions containing DDT prepared in accordance with the invention, there are many novel and unexpected advantages of the invention, some of which are as follows:

(1) Very high concentrations of DDT which are stable can be prepared in accordance with the invention. When solutions and emulsifiable mixtures are used as carriers, percentages higher than 30% of the active ingredient are difficult to produce because of the limited solubility of the DDT. On the other hand, it is preferred in accordance with this invention to prepare compositions having concentrations of 40% to 50% DDT.

(2) The water reducible compositions of this invention can be added to water reducible paints without seriously increasing their viscosities, or in the case of emulsion paints, without substantially interfering with the emulsion stability.

(3) The compositions prepared in accordance with the invention are essentially neutral rather than acidic or alkaline. It is known that under acid or alkaline conditions DDT is liable to decompose and lose chlorine. This condition usually exists when emulsions are prepared because they are seldom neutral.

The compositions of the present invention containing DDT are stable against decomposition due to dehydrohalogenation in the container.

(4) An important advantage of the compositions of the invention is their freedom from fatty solvents as unwanted toxicity is reduced to a minimum. In all heretofore proposed aqueous systems as used in conjunction with military operations, a solvent is employed to dissolve DDT. This solvent remains in the composition. The undesirable toxicity of DDT in solutions of fatty solvents has been reported in the conclusions given in Supplement No. 177 to the Public Health Reports published by the United States Public Health Service. To quote in part: "It should be pointed out that the solution of DDT in fatty oils definitely increases its toxicity . . ." ". . . due to the fat solvent properties of most petroleum distillates, irritation of the skin may occur following heavy exposure." In short, it is possible for DDT to be assimilated through the skin and mucous membranes when in solution in fatty solvents. Since in the compositions of the present invention no such fatty solvents are present, and the DDT is only soluble in water to the extent of about one part per million, these compositions reduce the danger of DDT assimilation to a minimum, comparable with dusting powders.

It is possible in accordance with this invention to provide highly concentrated and economical DDT insecticides which can be applied universally with less hazardous risk to useful life than are inherent in solvent-containing DDT compositions presently available commercially. For example, compositions of this invention may be reduced with water to a 5% concentration and sprayed without danger in a room where sparks or open fires may occur. Kerosene and other solvent preparations, especially when atomized as from a spray, present an explosion hazard at critical air-solvent concentrations.

This preparation can be used in leg makeup where considerable epidermis is in intimate contact with the product. It is ideally suited to the production of insecticidal paints by addition of it to the commercially available water reduced paints, or the product can be sprayed upon already painted surfaces. When water reduced it can be used as a rinse or spray for clothing that is to be worn in infected and infested areas, or stored. Animals can be dipped or sprayed with diluted solutions to rid them of infestation of ticks, lice, fleas, etc. As an insecticide for plant spray use, it has the novel advantage of not burning the tender plant cells with residual solvent.

(5) Still another advantage of the invention is the simplicity of the method of preparing the compositions. While the invention is not limited to any particular method, the compositions are readily prepared merely by grinding the mixture containing the active ingredient with small amounts, less than 1%, of a high viscosity methyl cellulose in a pebble mill. Other types of mills can also be used, such as a stone mill. The grinding apparatus preferably should be such that iron is not introduced into the mixture because small amounts of iron appear to catalyze the decomposition of DDT. Pebble mills used in practicing the process of the invention are normally made with porcelain bricks and employ porcelain balls for grinding.

The highly concentrated compositions prepared in accordance with the invention may be described as thixotropic. An important feature of the preferred compositions of the invention is that they contain a small quantity of a suitable methyl cellulose which is effective to suspend the active pest control ingredient in water, but insufficient to cover the entire surface area of the active ingredient with a film which will destroy or reduce the desired property of said active ingredient.

Having thus described the invention, what I claim as new and desire to secure by Letters Patent of the United States is:

1. A water reducible insecticidal concentrate consisting essentially of a microcrystalline suspension of at least 35% by weight of 1,1-bis(p-chlorophenyl)2,2,2 trichloroethane stabilized in an aqueous solution of a water soluble methyl cellulose, the quantity of said methyl cellulose being at least about 0.35% by weight and sufficient to wet said 1,1-bis(p-chlorophenyl)2,2,2 trichloroethane.

2. A water reducible insecticidal concentrate consisting essentially of a microcrystalline suspension of at least 35% 1,1-bis(p-chlorophenyl)-2,2,2 trichloroethane stabilized in an aqueous solution of at least about 0.35% by weight and not substantially more than 1% by weight of a high viscosity water soluble methyl cellulose, the quantity of said methyl cellulose being sufficient to wet said 1,1-bis (p-chlorophenyl)2,2,2 trichloroethane.

3. A method of preparing highly concentrated suspensions of 1,1-bis(p-chlorophenyl)2,2,2 trichloroethane which consists in grinding together about 35% to about 50% by weight of 1,1-bis-(p-chlorophenyl)2,2,2 trichloroethane, a quantity of a high viscosity water soluble methyl cellulose less than 1% by weight of the composition but sufficient to wet and to suspend said 1,1-bis(p-chlorophenyl)2,2,2 trichloroethane in water and the remainder water.

4. A water reducible insecticidal concentrate consisting essentially of a suspension of 35% to 50% by weight of finely divided 1,1-bis(p-chlorophenyl)2,2,2 trichloroethane in an aqueous solution containing at least 0.35% by weight and not more than 1% by weight of a high viscosity water soluble methyl cellulose, the quantity of said methyl cellulose being sufficient to wet said 1,1-bis (p-chlorophenyl)2,2,2 trichloroethane.

5. A water reducible insecticidal concentrate consisting essentially of a microcrystalline suspension of from about 35% to 50% of 1,1-bis(p-chlorophenyl)2,2,2 trichloroethane and from 0.35% to preferably not more than 25% of a low viscosity water soluble methyl cellulose, the quantity of said methyl cellulose being sufficient to wet said 1,1-bis(p-chlorophenyl) 2,2,2 trichloroethane.

RICHARD G. SMITH.

REFERENCES CITED

The following references are of record in the file of this patent:

UNITED STATES PATENTS

| Number | Name | Date |
| --- | --- | --- |
| Re. 22,700 | Muller | Dec. 4, 1945 |
| 2,216,045 | Powers | Sept. 24, 1940 |
| 2,369,992 | Treacy | Feb. 20, 1945 |
| 2,416,460 | Smith | Feb. 25, 1947 |
| 2,420,295 | Biehn | May 13, 1947 |

FOREIGN PATENTS

| Number | Country | Date |
| --- | --- | --- |
| 508,520 | Germany | Sept. 27, 1930 |
| 547,871 | Great Britain | Sept. 15, 1942 |

OTHER REFERENCES

DDT, by West and Campbell, Ed., page 46, publ. May 1946, by Chapman and Hall, Ltd., London.